(12) United States Patent
Evans et al.

(10) Patent No.: US 6,722,203 B1
(45) Date of Patent: Apr. 20, 2004

(54) STRONG-MOTION SEISMOLOGICAL ACCELEROMETER SYSTEM

(75) Inventors: John Richard Evans, Cupertino, CA (US); Robert H. Hamstra, Jr., San Jose, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 192 days.

(21) Appl. No.: 10/127,138

(22) Filed: Apr. 16, 2002

Related U.S. Application Data

(60) Provisional application No. 60/283,932, filed on Apr. 17, 2001.

(51) Int. Cl.[7] .......................... G01H 11/00; G01V 13/00
(52) U.S. Cl. .......................................... 73/649; 73/1.85
(58) Field of Search .................... 73/493, 497, 514.33, 73/649, 652, 1.37, 1.38, 1.82, 1.85; 702/14, 99; 33/1 HH; 181/108

(56) References Cited

U.S. PATENT DOCUMENTS

| | | | | | |
|---|---|---|---|---|---|
| 3,877,296 A | * | 4/1975 | Rihn | ............................ | 73/653 |
| 4,028,659 A | * | 6/1977 | Rihn | ............................ | 367/186 |
| 4,468,864 A | * | 9/1984 | Westphal et al. | ......... | 33/366.14 |

* cited by examiner

Primary Examiner—Richard A. Moller
(74) Attorney, Agent, or Firm—Mark Homer

(57) ABSTRACT

An accelerometer system principally for use in high spatial density urban arrays for near-real-time mapping of strong shaking due to large earthquakes. The present accelerometer system offers research-grade "16-bit resolution" (=90.3 dB dynamic range =$20\log(2^{15})$), and yet it is inexpensive to buy and inexpensive to maintain. A more efficient and accurate calibration and compensation procedure is also disclosed. The improved accelerometer system is ideally suited to any situation requiring large numbers of instruments, low installation costs, high robustness, low maintenance costs, and near-real-time response. The price/performance point achieved by the present invention far exceeds past instrumentation and opens many new markets.

18 Claims, 11 Drawing Sheets

STRONG-MOTION SEISMOLOGICAL ACCELEROMETER SYSTEM

This application is based upon provisional application No. 60/283,932 filed on Apr. 17, 2001 and hereby claims the benefit of that filing date under Title 35 of the United States Code, section 119(e).

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the invention

The present invention relates to strong-motion seismology (the recording of large accelerations from large earthquakes in the near and middle-distance fields) and, more particularly, to an improved accelerometer system for use in high spatial density urban arrays for near-real-time mapping of strong shaking due to large earthquakes.

2. Description of the Background

Strong-motion seismology entails the recording of large, linear accelerations from large earthquakes in the near and middle-distance fields. Strong motion seismology uses sensors called accelerometers to record these large-amplitude ground motions and the response of engineered structures to these motions. The recorded large-amplitude seismic waves can be used in researching the fault motions that produced the earthquake, the basin and other "path effects" modifying the motions between the fault and a given site, the local "site effects" such as local material wave speed, and the responses of the built environment at the site, together hopefully allowing prediction of the patterns of strong shaking from future large earthquakes.

In 1931, Congress allocated funds to the U.S. Coast and Geodetic Survey for development of a strong-motion seismograph (accelerograph), and the implementation and operation of a national strong-motion network. The first U.S. accelerographs were installed in southern California in the summer of 1932. By 1972 the network included 575 accelerographs at permanent stations located throughout the United States and in Central and South America. Responsibility for the network was transferred to the National Oceanic and Atmospheric Administration in 1970, and in 1973 the strong-motion program was absorbed by the U.S. Department of the Interior, U.S. Geological Survey. Today, the U.S. Geological Survey's National Strong-Motion Program (NSMP) has the primary Federal responsibility for recording each damaging earthquake in the United States. The program maintains a national cooperative instrumentation network, a national data center, and a supporting strong-motion data analyses and research center in support of this responsibility. Indeed, the NSMP counts some 1200 stations that participate in the National Strong-Motion Network (NSMN), and it operates over 900 strong-motion instruments of its own at approximately 628 permanent stations located in 32 States and the Caribbean. The NSMP currently employs two basic types of accelerometers:

(1) state-of-the-art research-grade instruments using macroscopic accelerometers (the most common examples are the Kinemetrics FBA-23™ and EpiSensor™). These typically cost $1000 or more per axis, with three axes required in a research instrument. Moreover, they are fragile, and easily destroyed by dropping even an inch or two onto a hard surface. They require careful, routine adjustments;

(2) lower grade macroscopic accelerometers which offer relatively poor resolution.

In addition, there are micro-machined accelerometers for seismic applications, for example, the Kinemetrics QDR™ and the Tokyo Gas Co., Ltd., SI Sensor™. The QDR™ has RMS (root mean square) noise levels over DC to 25 Hz of about 2.5 mg (thousandths of one "g", one g being the acceleration due to the Earth's gravity at its surface). Compared to a ±2 g full-scale range, this is 58 dB dynamic range (or even 3 dB less if one were to compare to an "RMS full scale", which would be $2/\sqrt{2}$ g. The SI sensors cost is in the vicinity of $5000 (complete with a recording and valve-control system). The accelerometer alone would be priced at about $600 for three components and reportedly has a dynamic range of somewhat better than 66 dB.

The severity of earthquake ground shaking varies tremendously over very short distances. For example, FIG. 1a shows the spatial variability of strong ground motion, expressed as the log-normal standard deviation between neighboring stations. Within a distance of as little as 1 km from the nearest station, one knows little more than what can be obtained from an attenuation relation, given only distance from the fault rupture, the geology of the site, and gross source directivity. For example, if some station measures 0.5 g peak ground acceleration (PGA), then at that distance of 1 km, under otherwise identical conditions, the shaking has one chance in three of being under 0.36 g or over 0.70 g, based on the curve shown in FIG. 1b. This large degree of variance over such a short distance can be the difference between moderate and heavy damage. Hence, there are critical needs, both in emergency response and in mitigation, to sample ground shaking densely enough to identify individual neighborhoods suffering localized, strong shaking. Dense sampling would be prohibitive using the foregoing accelerometers, which are either very expensive or suffer from poor performance. Thus, there is a great need for a low-cost, and yet robust high-performance accelerometer that is better suited for a spatially dense network of strong-motion seismographs.

There has been some work on micro-machined accelerometers. See, e.g., Evans, J. R., and J. A. Rogers, Relative performance of several inexpensive accelerometers, U.S. Geol. Surv. Open File Rep., 95-555, 38 pp., 1995, and Evans, J. R., The design and performance of a low-cost strong-motion sensor using the ICS-3028™ micromachined accelerometer, U.S. Geol. Surv. Open File Rep., 98-109, 30 pp. Evers (1998) introduced the ICS-3028™ micromachined accelerometer and suggests a new paradigm in strong-motion seismology where the necessarily few high-grade research instruments are augmented by spatially dense networks of robust, lower-cost instruments. Micro-machined silicon sensors generally have very significant cost and toughness (robustness) advantages over traditional macroscopic sensors. With these, it becomes possible to produce the equivalent of Doppler weather radar, showing earthquake-shaking "storms" and the badly shaken "squall lines" within them. This level of detail would benefit Emergency Services, seismologists, structural engineers, and others. The foregoing advantages, however, are often offset by higher instrumental noise (lower dynamic range). It would, therefore, be greatly advantageous to provide a supporting architecture and a new technique for precision temperature calibration and compensation which reduces the instrumental noise (improves the dynamic range), and increases the precision of the ICS-3028™ micromachined accelerometer, and does so with very low power consumption, thereby providing an accelerometer package with cost and performance advantages over existing art.

SUMMARY OF THE INVENTION

It is, therefore, an object of the present invention to provide a strong-motion seismological accelerometer system with very robust sensors that are resistant to mechanical shock, spring sag under long exposure to gravity, and other abuses, wear, and tear, resulting in low maintenance costs, and yet which can be manufactured at low cost.

It is another object to preserve the inherent dynamic range of the ICS-3028™ while compensating for it, and doing this at very low power.

It is another object to provide a strong-motion seismological accelerometer system as described above that provides for full calibration and compensation for the effects of temperature on sensor gain and offset.

It is still another object to provide a strong-motion seismological accelerometer system as described above with excellent signal-quality characteristics and low system noise with >90.3 dB signal-to-noise ratio in the band 0.1 to 35 Hz.

It is yet another object to accomplish all of the foregoing in a configuration that provides for practical manufacturability.

According to the present invention, the above-described and other objects are accomplished with an improved accelerometer system principally for use in high spatial density urban arrays for near-real-time mapping of strong shaking due to large earthquakes. The system relies on a robust accelerometer sensor that includes three accelerometer sensor circuit boards for measuring acceleration along the seismic axes "Vertical" (positive up), "North", and "East" in that order, which correspond in a right-handed (x,y,z) coordinate system to the axes z, y, and x, respectively. Each of the boards includes a micro-machined accelerometer component with a piezo-resistor bridge and certain compensating resistors. In addition, a main circuit board houses a regulated power supply, amplifiers, and other peripheral circuitry. All of the foregoing circuit boards are mounted on a non-conductive block having at least three substantially orthogonal faces. Thus, the three accelerometer sensor circuit boards are each mounted on a respective orthogonal face of the non-conductive block.

This configuration helps to achieve research-grade "16-bit resolution" (=90.3 dB dynamic range =20log($2^{15}$)), and yet it is inexpensive to buy and inexpensive to maintain. This makes the present sensor configuration ideally suited to any situation requiring large numbers of instruments, low installation costs, high robustness, low maintenance costs, and near-real-time response. Moreover, the design configuration provides for practical manufacturability, which is no small feat in this context. In particular, the severance of the circuitry into discrete accelerometer sensor boards containing the accelerometer component with piezo-resistor Wheatstone bridges, plus a fourth and separate main circuit board containing the supporting circuitry (amplifiers and anti-alias filters) for all three accelerometer sensors, as well as the orthogonal mounting of the circuit boards on a non-conductive mounting block are integral features toward accomplishing this.

An improved calibration and compensation technique is also disclosed which includes a Manufacturing Calibration Procedure performed in the manufacturing plant, the results being used for Digital Compensation by software after the output of the accelerometer 100 is digitized (a zero noise, high accuracy, low cost method). This dual-calibration and compensation division between passive low-noise analog and active zero-noise digital is another key element of the present accelerometer system, required for preserving the low noise characteristics of the ICS-3028™. In effect, this allows low-cost low-noise high-precision compensation for temperature effects. Overall, the price/performance point achieved by the present invention far exceeds past instrumentation and opens many new markets.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Figure 1A:
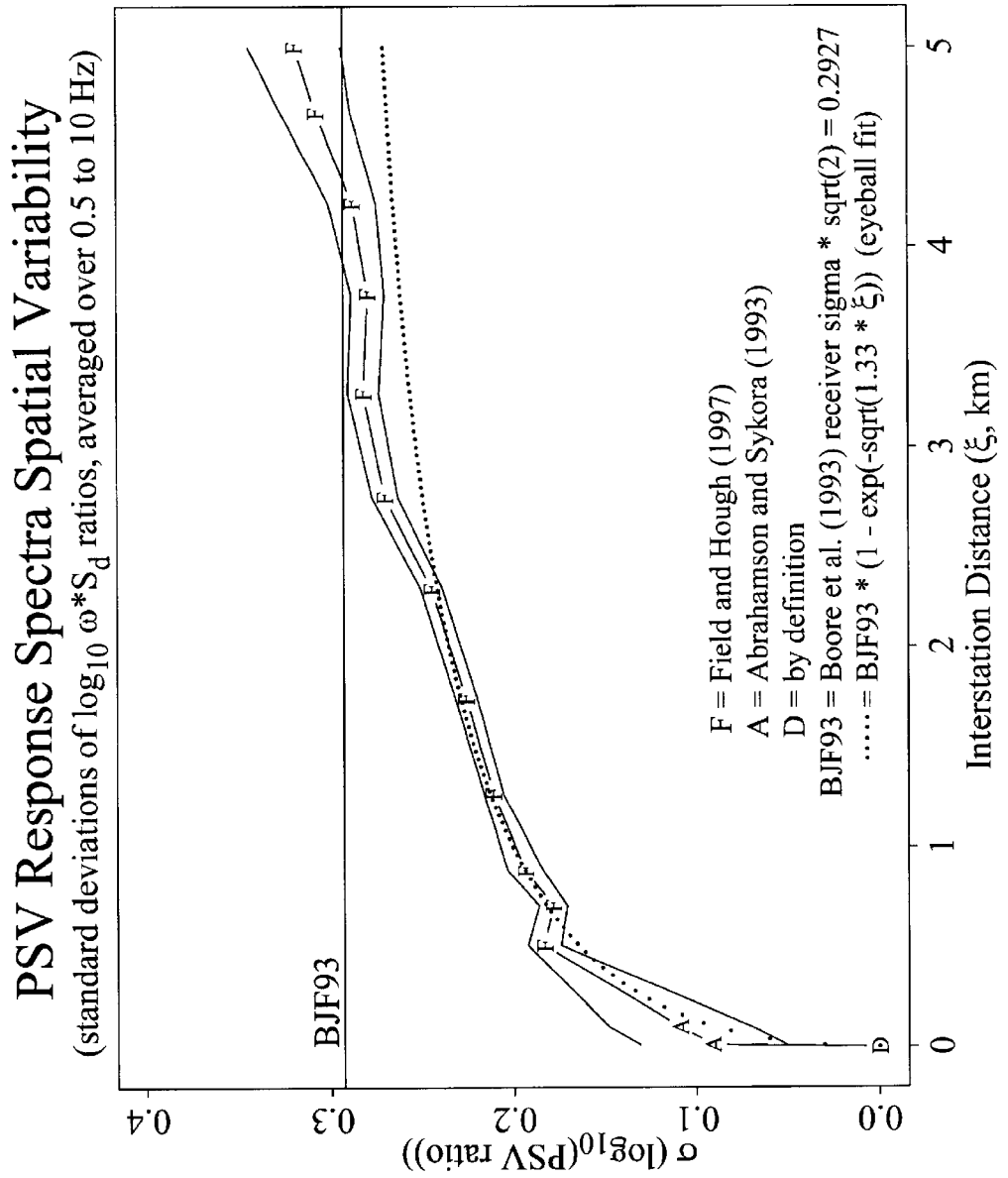
FIG. 1a is a graph showing the spatial variability of strong ground motion, expressed as the log-normal standard deviation ($\Phi$)) between neighboring stations. ("Pseudovelocity response spectra" (PSV) are engineering measures of earthquake shaking strength in terms of the responses of elementary "structures", lightly damped single-degree-of-freedom mechanical oscillators.)
Figure 1B:
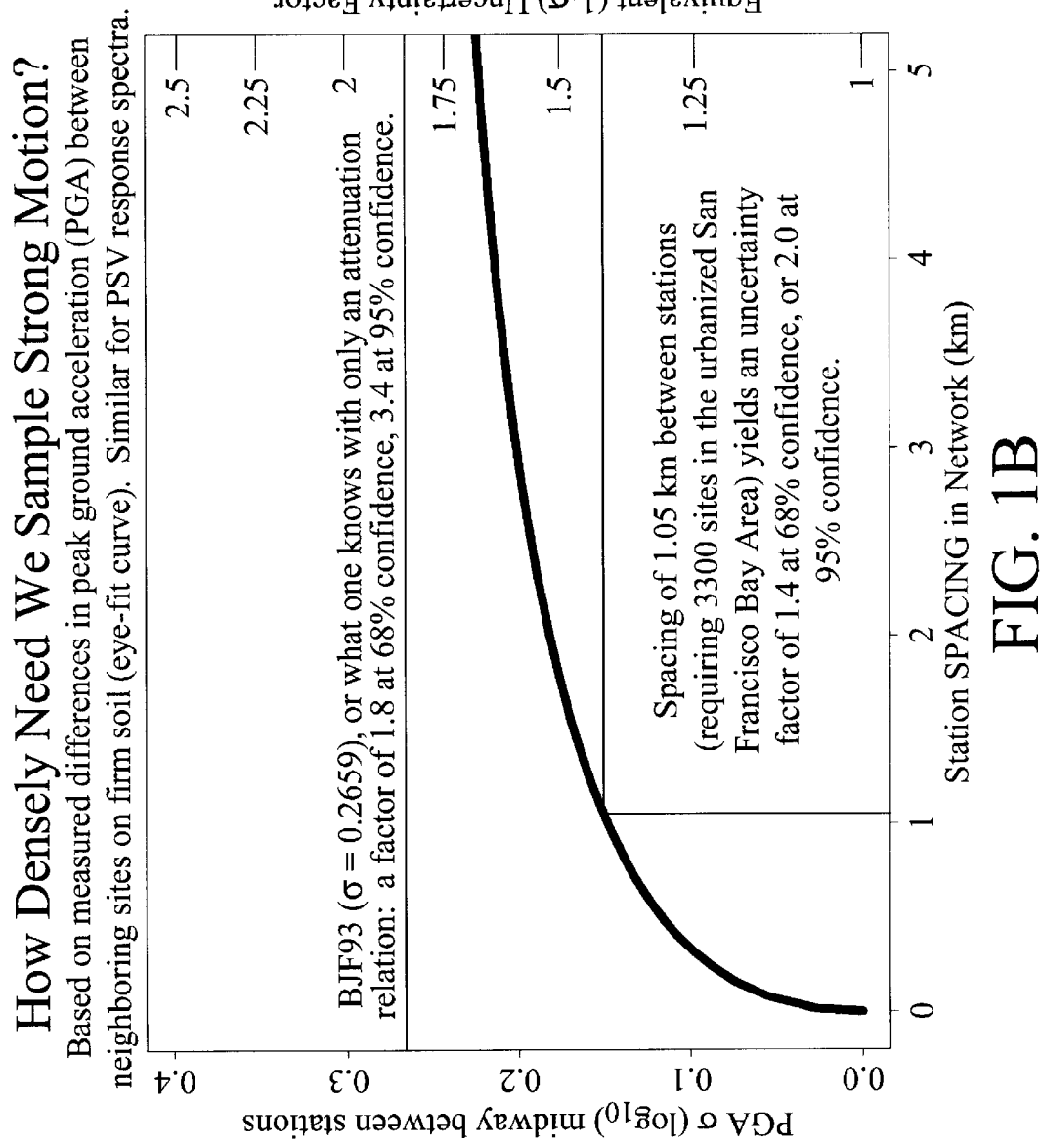
FIG. 1b shows the equivalent variability for peak ground acceleration (PGA, another simple measure of shaking strength), with the log-normal standard deviations also translated into multiplicative uncertainty factors on the right-hand scale.

The present invention is an accelerometer system that is built around a micro-machined accelerometer component, the system being inclusive of improved supporting architecture, improved features for manufacturing cost reduction, and a new technique for precision temperature calibration and compensation which reduces the instrumental noise, improves the absolute precision of the system, and improves the dynamic range of the ICS-3028, thereby providing significant cost and performance advantages over existing art.

1. The Accelerometer

The present invention requires an accelerometer component having a piezo-resistive Wheatstone bridge as its sensing element. Although there may be other suitable products, the presently-preferred accelerometer component is the commercially-available ICS-3028™ accelerometer (or its equivalent, the ICS-3022™, which differs only in component packaging). These are both micro-machined silicon accelerometers that produce an output voltage in response to linear accelerations applied perpendicular to the base of the accelerometer, but not to cross-axis accelerations or rotations. They are produced from bulk silicon by techniques very similar to integrated circuit manufacturing. Device reliability is therefore greatly increased over It existing mechanical accelerometers. The ICS-3028™ is inherently very robust and able to withstand 400 g of mechanical shock and 40 g RMS of vibration without damage. It also exhibits no measurable sag in the supporting springs after very long exposure to gravity. These factors, preserved by careful mechanical and electrical engineering of the other components of the system, provide the present accelerometer system with unique robustness and low production and maintenance costs. Each sensor is calibrated individually by the manufacturer (EG&G ICSensors, Inc.®, Milpitas, Calif.) and supplied along with calibration-resistor values and related information. Unfortunately, the ICS-3028™ is quite sensitive to temperature and this causes variations with temperature of the device's sensitivity to acceleration and of its offset (the voltage produced under zero acceleration). The improved supporting architecture and technique for precision temperature calibration and compensation according to the present invention minimizes these temperature sensitivities.

2. Improved Supporting Circuitry

As described above, the ICS-3028™ is based on a Wheatstone bridge comprised of piezoresistors within the four cantilever springs supporting the proof mass. The physical and electrical layout of the supporting circuitry according to the present invention helps to minimize temperature variations in time. Physically, this is accomplished by mounting the three accelerometers on separate, small printed circuit boards (PCBs) in intimate contact with a low thermal conductivity material such as Delrin™. More importantly, the temperature sensing element used is precisely the same element used to sense the acceleration, namely, the Wheatstone bridge. Total bridge resistance indicates sensor temperature while bridge imbalance indicates acceleration. The intimacy (indeed, the identity) of the temperature-sensing elements with the acceleration-sensing elements implies almost zero temperature variation effect between temperature sensor and the devices being compensated for temperature. (Only rapid changes in temperature, leading to thermal gradients across the accelerometer die can cause problems, hence our attention to slowing temperature changes by intimate contact between the accelerometer 100 and the Delrin™ mounting block 110) The corresponding amplifiers and anti-alias filters for all three accelerometers are mounted on a separate main PCB. Each of the three accelerometer boards is mounted along one of three orthogonal faces of the Delrin™ block 110 as will be described. Voltage reference circuitry and power conditioning circuits are mounted on the main PCB as well. This block configuration ensures orthogonality of the three accelerometers. The complete isolation of all resistors that are unique to a specific accelerometer on the same PCB with that accelerometer prevents errors in this association while preserving manufacturing, maintenance, and upgrade flexibility and minimizing cost. The improved physical layout of the circuitry is described in more detail in section A below, and the electrical layout is described in section B.

A. Improved Physical Layout with Orthogonal Boards

In accordance with the present invention, complete isolation of all resistors that are unique to a specific accelerometer is achieved by placing them on the same printed circuit board with that accelerometer. There are three accelerometers per sensor system, and hence three accelerometer boards. Each of the three accelerometer boards is mounted orthogonally along one face of a block (e.g., Vertical, North, East, corresponding to z, y, and x). There are corresponding amplifiers and anti-alias filters for each of the three accelerometers, and yet all this supporting circuitry is mounted on one separate main PCB. Power-related circuitry is mounted on this same main board 108, separate from the accelerometers 102, 104, 106.

Figure 2:
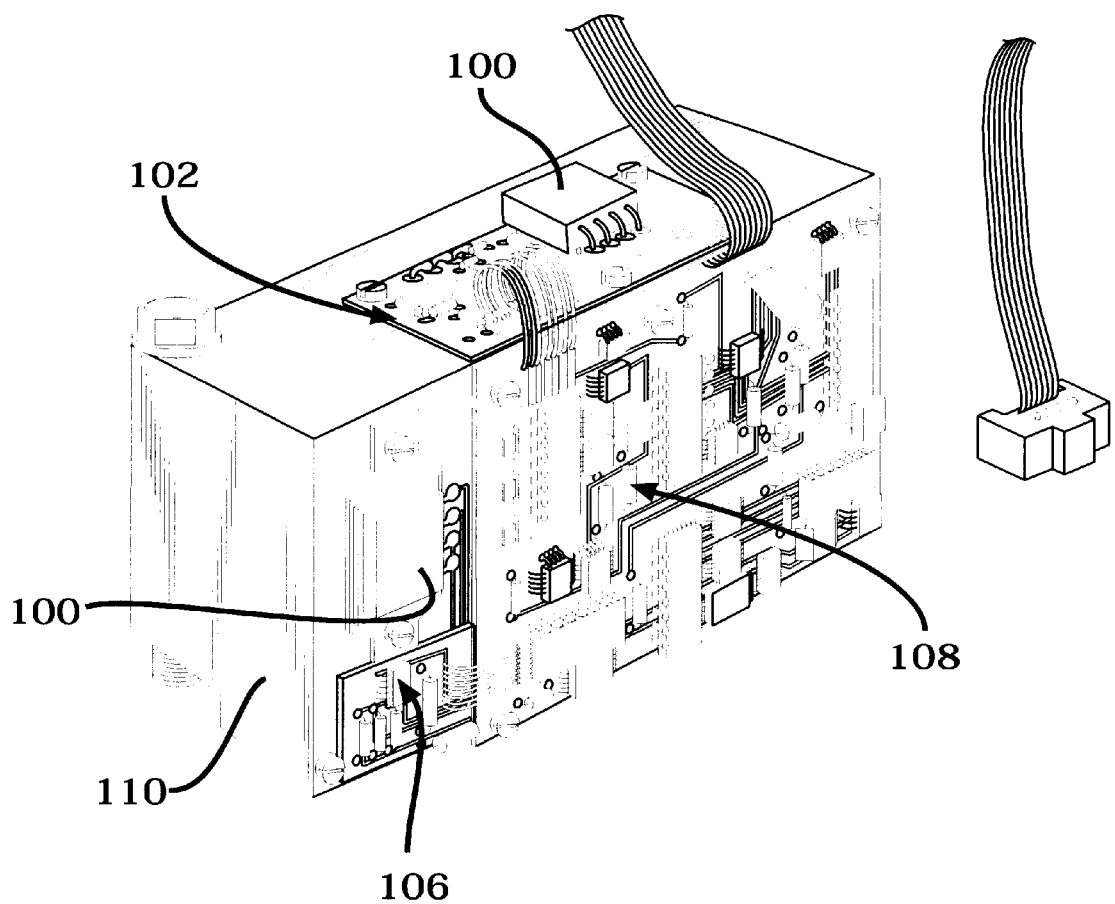
FIG. 2 is a perspective view of the particular mounting arrangement according to the present invention.

FIG. 2 is a perspective view of the particular mounting arrangement according to the present invention. Each accelerometer component 100 is mounted as shown on a separate accelerometer circuit board 102, 104, 106, respectively Vertical, North, East (z,y,x). Preferably, the accelerometer components 100 are mounted both by soldering to the PCB and by screws. The accelerometer components 100 are connected to corresponding circuitry (as will be described with reference to FIG. 3b) on respective accelerometer PCBs 102, 104, 106, and each PCB is mounted orthogonally flush against a face of machined plastic block 110.

A main PCB 108 (containing the circuitry to be described with reference to FIGS. 4a & 4b) is mounted as shown, and may be mounted on stand-offs (not shown) to provide room for leads, components, and cooling air.

Each of the accelerometer PCBs 102, 104, 106 is connected to the main PCB 108 by a short, flexible multi-lead flat cable or leads. The foregoing segregation of the accelerometer PCBs 102, 104, 106 and connection to the main PCB 108 by short, flexible leads greatly simplifies calibration, upgrading, and other manufacturing concerns. The flexible leads allow all four PCBs 102–108 to be mounted co-planar during calibration, so that only two orientations (accelerometer axes all pointing up and all pointing down, or the +1 g and −1 g orientations) are required for a complete and accurate calibration sequence. This innovation greatly speeds the calibration procedure.

Figure 3A:
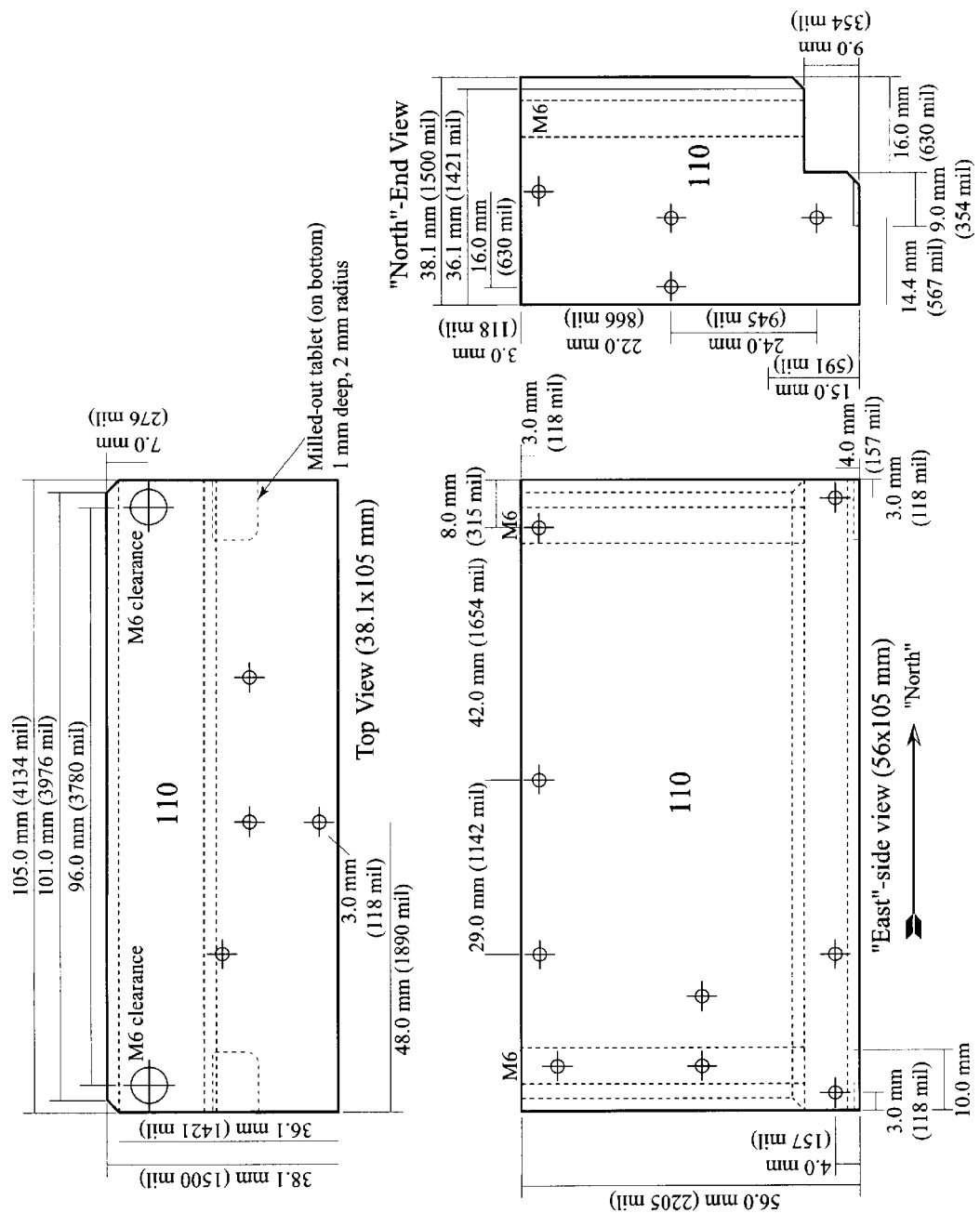
FIGS. 3a and b respectively show the mounting block and an exploded composite view of the four printed circuit boards (PCBs) in their mounting arrangement containing the schematic circuitry of FIGS. 4a, 4b and 5.
Figure 3B:
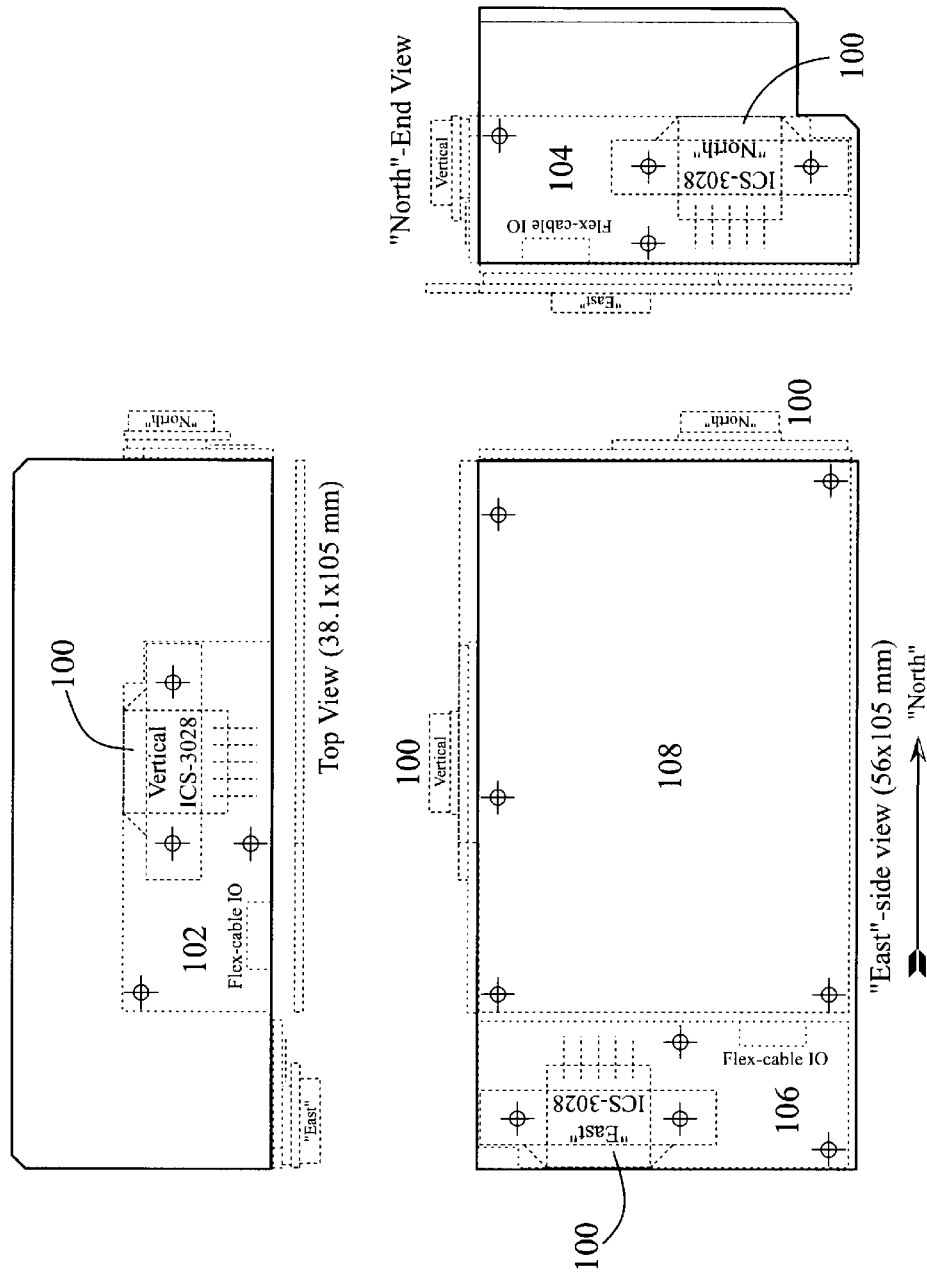

Plastic block 110 is preferably made of Delrin™ polyoxymethylene, chosen for its strength over temperature, its machineability, and its relatively low cost. By using an electrically non-conductive material, flush mounting is possible and issues of strains introduced into the accelerometer or vibrations of the mounting system are minimized. Because Delrin™ also has low thermal conductivity, this system also provides a degree of thermal stability that is desirable in these temperature-sensitive devices. This design feature (flush mounting to a rigid insulating block) is a key feature of the present accelerometer system, allowing low cost and manufacturability in synergy with issues of isolating accelerometer-specific resistors with the appropriate accelerometers. Specifically, the block 110 can be milled from 1.5" thick polyoxymethylene (e.g., Delring) sheet. FIGS. 3a and 3b are a composite view of the top, side and end panels of the block 110. FIG. 3a details the design of the block per se and FIG. 3b shows the mounting of components on the block. The PCBs 102–108 are mounted to the faces of the block as shown in FIGS. 2 and 3b. Specifically, PCBs 102–108 are approximately 1/16" thick, and are mounted to the faces of block 110, either flush (102–104) or on 3-mm or 1/8" nylon spacers (108). The main PCB 108 area is approximately 7.7 in², and each accelerometer PCB 102, 104, 106 is approximately 1.8 in², of which about 0.6 in² is available for calibration resistors.

The foregoing configuration prevents associational errors while preserving flexibility and minimizing cost (only the small accelerometer boards need pass through the special production line where unique resistors are paired off with individual sensors). The main PCBs 108 with their static-sensitive parts are the same from one to another and can be assembled and tested before being associated with the accelerometers. Lastly, by having the accelerometers on separate, small PCBs, they are mechanically isolated from stresses in the rest of the system, stresses that can cause serious offsets and malfunctions in these fundamentally stress-sensing devices. Among other things, having the accelerometer soldered to the small PCB to which it is also attached by screws (which also hold the accelerometer 100 and PCBs 102, 104, 106 against the mounting block 110) reduces the chance of feeding stresses from other parts of the system back into the accelerometer via its leads, a problem with prior designs. Having the accelerometers 100 against relatively soft PCB material and the PCB against relatively soft plastic also reduces the chances of dust lodged between the parts imparting significant stresses into the accelerometer component package 100, another source of problematic stress feedback in prior designs. The separate accelerometer PCBs 102, 104, 106 also provide greater packaging flexibility when dealing with the requirement of three orthogonal axes in a small space and parallel axes during calibration. Only the small accelerometer boards 102, 104, 106 need pass through a special production line where unique resistors are paired off with individual accelerometer components 100.

B. Electrical Layout

Figure 4A:
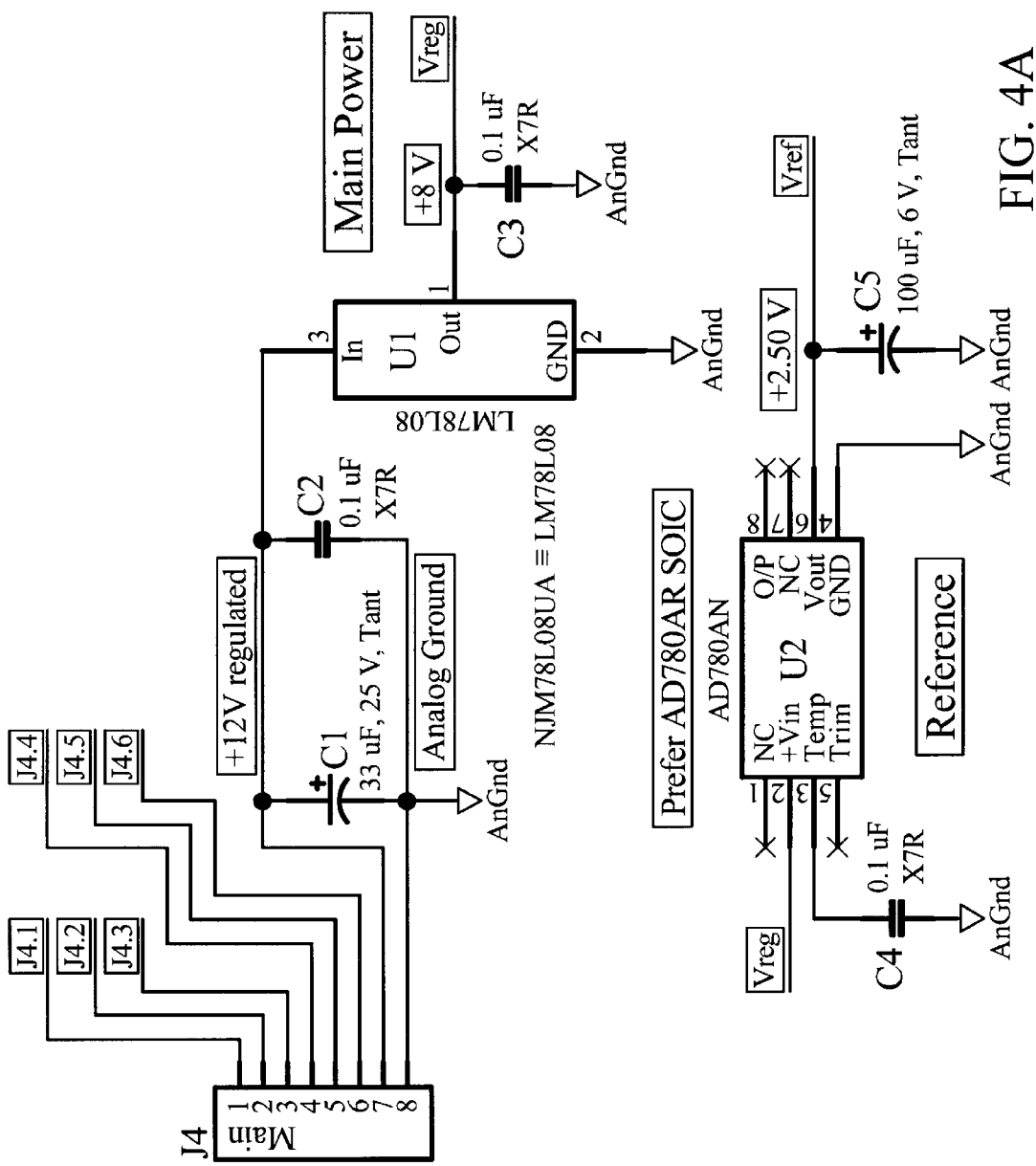
FIGS. 4a, 4b, and 5 collectively comprise a schematic diagram of one of the three accelerometer channels of the present accelerometer system.
Figure 4B:
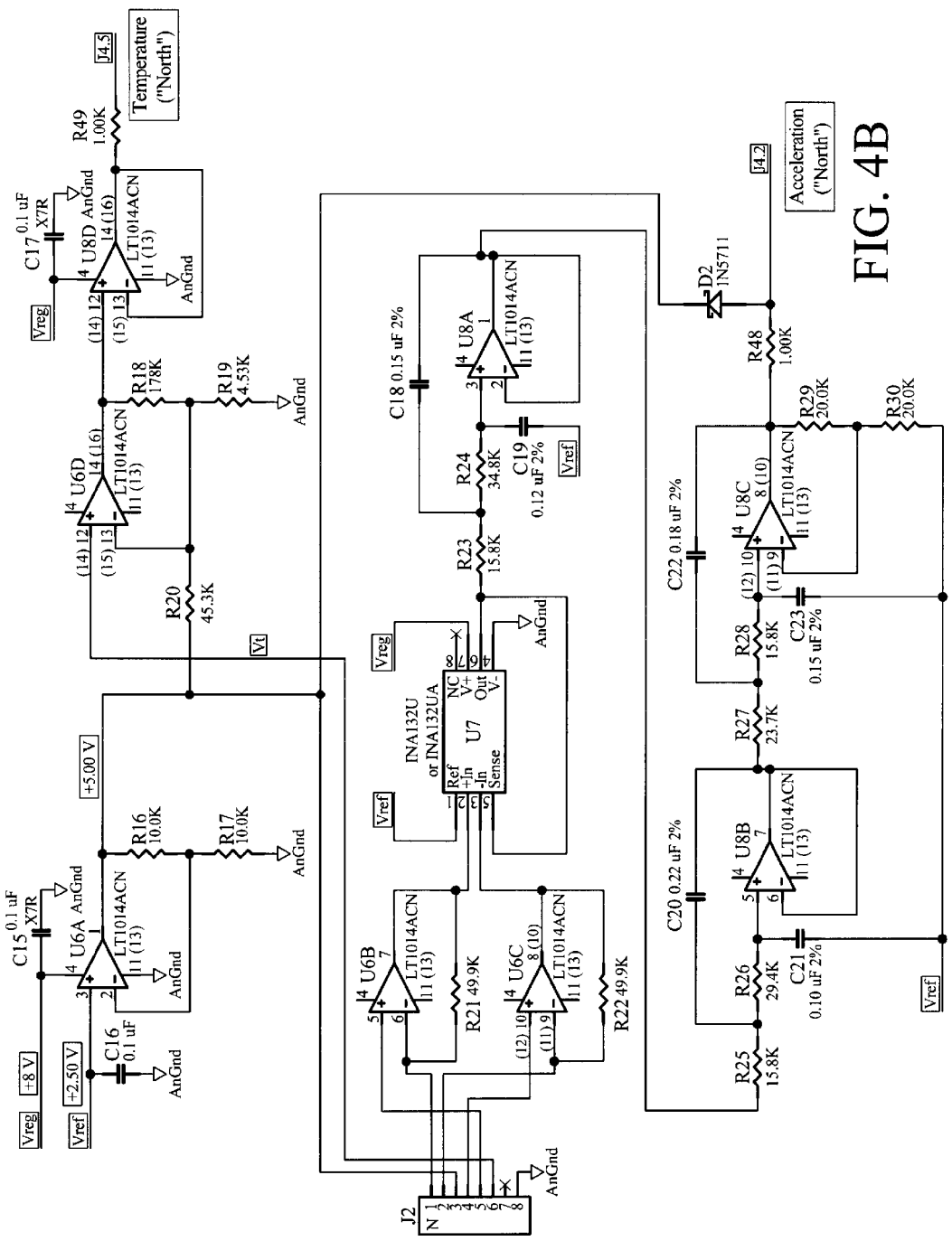
Figure 5:
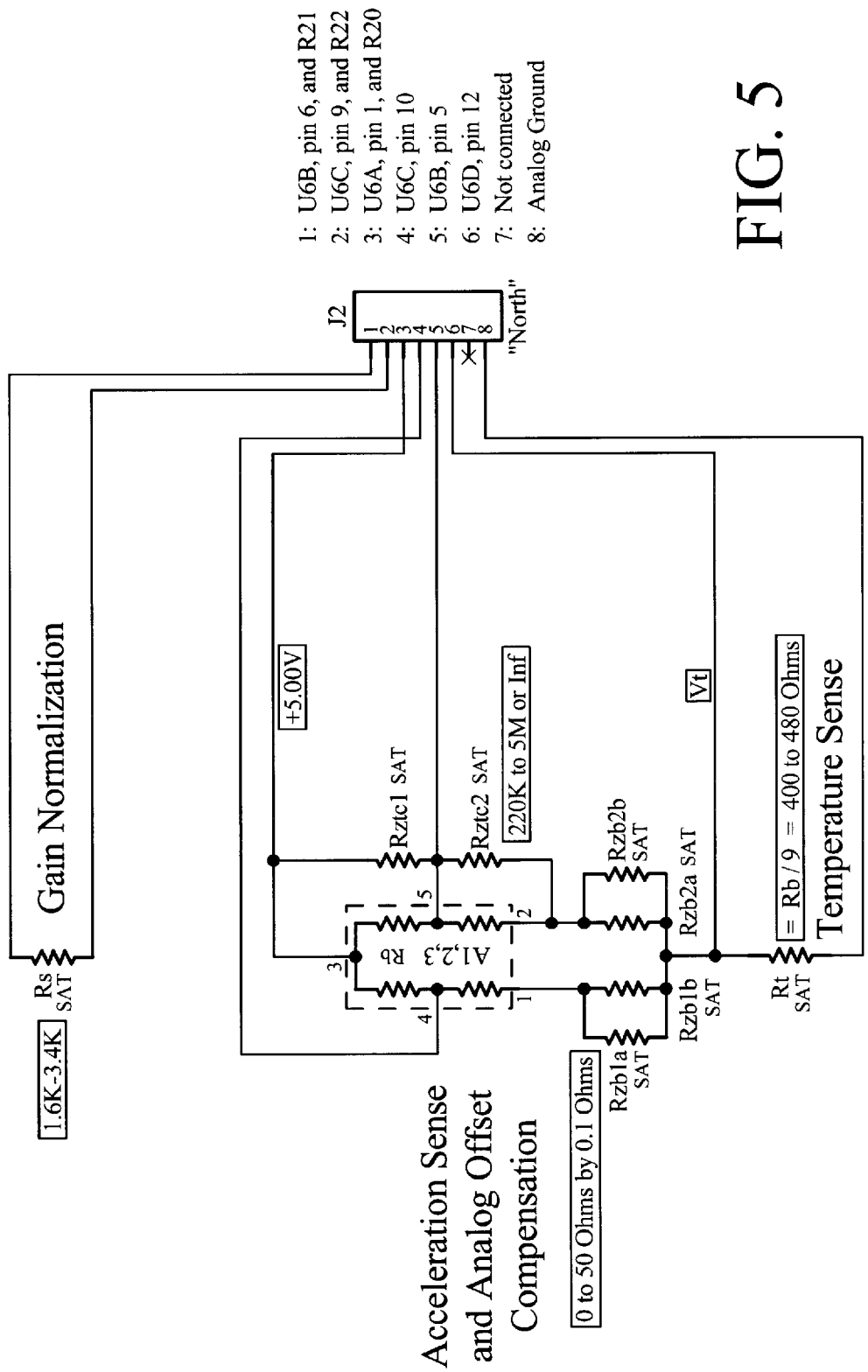

As described above, there are three separate accelerometer boards 102, 104, 106 as shown in FIGS. 2 and 3b, and one main board 108. FIGS. 4a and 4b collectively comprise a schematic diagram of the main board 108, and FIG. 5 is a schematic of an exemplary accelerometer board 104 according to the present accelerometer system. The main board 108 of FIGS. 4a and 4b includes power conditioning components and a 2.50-VDC low-noise precision voltage reference shown in FIG. 4a, plus in FIG. 4b the amplifiers, anti-alias filters, and signal conditioning for the temperature-sensing elements shown in FIG. 5. (Temperature variations are sensed from variations of the bridge resistance Rb, in turn sensed across resistor Rt.) The circuitry of FIGS. 4b and 5 is repeated once for each of the three accelerometer boards 102, 104, 106, while that of FIG. 4a is singular.

As shown in FIG. 4a, the main circuit includes power conditioning using a fixed voltage regulator LM78L08 (U1 and associated capacitors C1–C3). The power supply provides quiet power to the signal conditioning circuitry, nominally at 8 V. It uses low-cost low-noise linear components. Input to this circuit is about +12 V.

In addition, a 2.50-VDC low-noise precision voltage reference, Analog Devices AD780, (U2 and associated capacitors C4–C5) is provided. These devices offer low initial error and temperature drift combined with low output noise. The low-noise 2.50-V reference drives the accelerometer bridge through an amplifier/buffer as will be described.

Throughout the schematics, capacitors designated "0.1 uF X7R" (meaning "tF", of course), are noise reduction or oscillation-suppression devices, and should be proximal to both the device served and a substantial ground lead.

As seen in FIG. 4b, the main circuit also includes amplifiers, anti-alias filters, and signal conditioning for the temperature-sensing elements. As can be seen in FIG. 5, the acceleration it signal from the bridge of the ICS-3028™ are applied to J2, pins 4 and 5, thence in FIG. 4b to a differential amplifier formed by components U6B and C. The gain of this amplifier is set by Rs (FIG. 5, via J2, pins 1 and 2). From the differential amplifier, which minimizes common-mode noise and provides the primary gain step, the signal passes to U7, where it is converted to a single-ended signal. From U7, the signal passes into a sixth-order Butterworth anti-alias filter comprising U8A, B, and C and associated capacitors and resistors. This filter also provides an additional gain factor of 2.0. Suitable operational amplifiers U6A–U8D are LT1014 Quad Precision Op Amps, and an INA 132, Low Power, Single-Supply Difference Amplifier is used for U7. It should be noted that any reasonable anti-alias low-pass filters and precision differential amplifiers can be used here. The output of the sixth-order Butterworth anti-alias filter (U8A, B, and C) passes into a circuit comprising Schottky diode D2 and resistor R48. These serve to limit the output to a value that can be tolerated by the ADC (in this case about 5 V), while R48 also serves to prevent output-stage oscillation. This circuit performs front-end signal conditioning. It is suggested that 2% capacitors and 1% resistors be used, and the filters can be individually tuned by selecting matching resistors.

The precision voltage reference from FIG. 4a is doubled to 5.00 VDC by U6A, which also provides enough drive current for the bridge. This current is applied to the bridge via J2, pin 3. The three single-ended acceleration signals are brought out at J4, pins 1, 2, and 3 with 0.5 to 4.5 V corresponding to about −2 to +2 g accelerations.

The ICS-3028™ requires temperature compensation because the resistors of the Wheatstone bridge are temperature sensitive (their resistance varies with temperature). For precisely this reason, they also serve well as the sensing elements for temperature itself. We use total bridge resistance, Rb, as the temperature sensing element. Acceleration is then indicated by bridge imbalance while temperature is indicated by total bridge resistance. In particular, the voltage across Rt varies in inverse proportion to Rb as $Vt = 2Vref(1-Rb/(Rt+Rb))$ and is our surrogate for temperature (the small values of the bridge balancing resistors have a negligible effect). All calibrations are referred to this voltage. In the embodiment shown in FIGS. 4b and 5, this bridge-resistance voltage is passed through J2, pin 6, to pin 12 of U6D where gain and offset are applied to scale the output to approximately 0.5 VDC at −10° C., 2.5 VDC at +25° C., and 4.5 VDC at +60° C. Unity gain amplifier U8D simply buffers the output and R49 and prevents output oscillation. As described below, the detailed proportionality and linearity of this relationship are unimportant to the calibration and compensation outcome.

The three conditioned bridge-temperature signals for Vertical, North, and East are brought out at J4, pins 4, 5, and 6.

FIG. 5 is a schematic diagram of an exemplary accelerometer channel as is resident on each of accelerometer PCBs 102, 104, 106. The circuit in FIG. 5 is identical for each of the three resident channels (e.g., Vertical, North, East) on respective PCBs 102, 104, 106, but the component values are unique to the particular accelerometer 100 used on that channel. The ICS-3028™ accelerometer is connected by connectors J1, J2, J3 to each of the three acceleration channels (e.g., Vertical, North, East) on PCBs 102, 104, 106 as represented in FIG. 5, and hence to all individual compensating resistors, Rzb1 a,b, Rzb2a,b, Rztc1, and Rztc2 as shown in FIG. 5. These compensating resistors (the values are taken directly from the manufacturer's calibration sheet for the same-named items) balance the bridge (Rzb1a and b, and Rzb2a and b) and compensate for its offset, much of the offset's temperature drift (Rztc1 and 2), and most of the gain variation between individual sensors (Rs). In practice, either Rzb1 a,b or Rzb2a,b is a 0 ohm resistor or a jumper, and either Rztc1 or Rztc2 is left out of the circuit, has infinite resistance. The balancing resistors Rzb1a,b and Rzb2a,b are parallel pairs to allow very close matching of the required very low resistances. Accuracy of +/-0.1 ohm is generally required for this match. All these resistors should be metal film or equivalently low-noise resistors. Since the resistors on FIG. 5 are low-noise passive devices; they do not present a noise problem to the sensor beyond their thermal Johnson noise. However, compensating for sensor gain and smaller offset effects require active components that would inject significant, unacceptable junction noise into the most sensitive portion of the sensor system. Therefore, these temperature effects are compensated for by digital processing after amplification, filtering, and conversion. In regard to FIGS. 2 and 5, the vertical channel of PCB 104 has one distinction, in that it must be compensated for the static 1-g force of gravity acting upon that accelerometer 100. This compensation can be accomplished by deliberately unbalancing that accelerometer's bridge by adjusting the values of Rzb1 a, b or Rzb2a,b by about 30 ohms. Alternatively, a voltage applied at U7 could produce the necessary offset to keep the output of the vertical channel near 2.5 V at rest, like the horizontal channels' outputs.

3. Improved Calibration and Compensation Procedure

Again, the three accelerometers 100 are not temperature compensated and the piezoresistors make them quite sensitive to temperature (for gain, typically –0. 17% of full scale (FS) per ° C., or about –0.034 g over +10° C. in the 2-g presently used). The temperature sensitivity results in variations with temperature of the device's sensitivity to acceleration and of its offset (the voltage produced under zero acceleration). These temperature sensitivities are unique to each accelerometer component 100, requiring calibration and compensation for each. Gross inaccuracies are compensated by use of the manufacturer's specified calibration values, which are not always precise. Specifically, the gain of the amplifier is adjusted for each accelerometer component by manipulating the value of Rs (FIG. 5), while offset and its temperature variations are compensated by the Rzb and Rztc resistor sets, respectively. The manufacturer of accelerometer sensor components (such as ICS for their ICS-3028™) normally specifies the appropriate values for Rzb, Rztc and the Rs resistors. There is also an active circuit suggested by ICS to compensate temperature variations of gain, but in fact this circuit is too noisy. ICS promotes the specified values as being adequate compensation, but one should expect ~10% gain errors at room temperature, up to 9%FS offset variations over 100° C. These errors are not acceptable. Consequently, the present inventors have developed a dual method for calibration and compensation that greatly improves that accuracy while keeping noise and power use very low. The present method takes place after the resistors have been attached, and does not require any further manual modification of any kind. Rather, a manufacturing calibration procedure and ensuing digital compensation is implemented as described below. Specifically, a Manufacturing Calibration Procedure is performed in the manufacturing plant, and the results are used for a Digital Compensation that entails compensation by software after the output of the accelerometer 100 is digitized (a zero noise, high accuracy, low cost method). This dual-calibration and compensation division between passive low-noise analog and active zero-noise digital is a key element of the present accelerometer system, required for preserving the low noise characteristics of the ICS-3028™. In effect, this allows low-cost low-noise high-precision compensation for temperature effects.

A. Manufacturing Calibration

The present inventors have determined that the temperature sensitivity of the bridge piezoresistors can be used to perform a Manufacturing Calibration Procedure for the system. This Manufacturing Calibration Procedure may be performed in the manufacturing plant. With regard to FIG. 5, the total bridge resistance is measured as an indication of the accelerometer's temperature. More specifically, the voltage across Rt (FIG. 5) is measured, where Rt is set equal to one-ninth of the bridge resistance Rb. The value of Rb is reported in the manufacturer's calibration sheet for that sensor. The voltage across Rt is reported out at J2, pin 6, hence to U6D of FIG. 4b, where it is amplified and offset so that it produces a voltage of approximately 0.5 V at –10° C., 2.5 V at +25° C., and +4.5 V at +60° C. These match the input voltage range of the ADC (0–5 V) currently used and the operating range typically required in strong-motion seismology (–10° C. to +60° C.). It is not important for these voltages to be matched to particular temperatures in any precise way as long as the operating range of the instrument is covered within the range of the ADC. This is so because there is no reference to actual, absolute temperature anywhere in the calibration and compensation procedure. The temperature signal is currently buffered through U8D, but this is not required and is only done here because that amplifier would otherwise be unused. Resistor R49 prevents oscillations of the output, which directly drives an ADC. The acceleration signal from the bridge of the ICS-3028™ is applied to J3, pins 4 and 5, and hence to the differential amplifier formed by U6B and C. The gross gain of the amplifier is adjusted for that particular accelerometer by Rs, which is carried from the PCB holding the accelerometer (FIG. 5) to the PCB carrying the amplifiers (FIG. 4b) via J2, pins 1 and 2. This indirection allows the accelerometer-specific resister Rs to be physically attached to that accelerometer while not requiring the amplifiers to be so attached, thereby preventing incorrect association of the gain resistor during manufacture and maintenance procedures. The bridge-resistance voltage as a surrogate of temperature is ideal in that it measures, in the most intimate possible manner, the temperature of exactly the elements that must be compensated, namely, the resistors of the accelerometer bridge itself. It works precisely because these resistors are quite sensitive to temperature. A specific example of a Manufacturing Calibration Procedure for the system follows.

(1) the four PCBs 102, 104, 106, 108 are mounted co-planar, with the three accelerometer boards 102, 104, 106 protected from vibrations, on an invertible jig in an environmental chamber that can be quickly driven over the range from –15EC to +65EC. The jig may be Delrin™ in order to provide the necessary electrical insulation but it must then be supported by metal or some other material that does not sag at high temperatures. To speed thermal equilibration, it is desirable for the jig to be made of Aluminum (preferably a large heat sink with fins on the side opposite the PCBs) with a thin insulating cover to electrically isolate the accelerometer PCBs 102, 104, 106.

(2) An integrating voltmeter is applied to read the outputs of J4, pins 1 through 6 with high precision and repeatability. An Agilent 34970A or comparable instrument, integrating over at least 20 cycles of mains power and reporting 6½ digits of accuracy is preferred for these measurements.

(3) Drive the environmental chamber to a particular temperature and allow the accelerometers 100 adequate time to stabilize to that temperature (for minimum equilibration time, it may be desirable to drive the chamber somewhat beyond the target temperature for several minutes, then go back to the target temperature briefly before taking the measurement.) It is not essential for the accelerometers' temperature to be absolutely stable during the measurement, only that the temperature-indicating voltages Vt at J4, pins 4, 5, and 6, vary by no more than about 2 mV (equivalent to about 0.04° C. or about 0.2% of Full Scale) during the measurement sequence at that temperature setting of the chamber.

(4) Take a series of test-vector pairs, each vector consisting of six values (one per pin), and each vector pair consisting of one vector in the +1 g position and one vector in the −1 g position. A total of four or more test-vector pairs are recommended, alternating which g position is taken first, to permit generation of quality-control statistics. This measurement sequence is readily achieved within the narrow temperature range required. This sequence can be completed in a few seconds with automated test equipment. It is noteworthy that the vectors should be +−−++−−+or the reverse, so that hysteresis is eliminated. That is, they should not all be from +1 to −1 g, or from −1 to +1 g, but should be alternating and even in number so that any hysteresis in the sensor averages out. In practice, the ICS-3028™ sensor has such small hysteresis that it does not matter, but alternating/even sequence speeds the calibration process and lowers manufacturing cost.

(5) The sensitivity (Volts per g) of a given acceleration channel at that temperature for a given measurement pair (+1 g versus −1 g), is calculated to be half the difference in the measured voltages, e.g., the +1 g voltage minus the −1 g voltage. With redundant measurements, the mean of these sensitivities is used as the determinative value for further analysis. The range or standard deviation of the redundant measurements is a test of measurement quality and should be small. The offset (Volts) of the accelerometer at that temperature is then half the sum of the two voltages, and the host controller is programmed to compensate all acceleration measurements accordingly. The temperature surrogate against which both sensitivity and offset are calibrated and compensated is the mean of the voltages across the corresponding Rt. Measurements should be taken at six or more temperatures spanning the operating range, with eight or more temperatures recommended, because a second- or third-order polynomial is used subsequently to make the compensation and one requires redundant data to obtain reliable regression statistics while being certain to uncover behavior at all relevant temperatures.

B. Digital Compensation

This second step of the dual Calibration and Compensation Procedure is a digital compensation of the sensor gain and offset, using the data derived from the above-described Manufacturing Calibration Procedure for the system, to correct for errors in the specified resistor values and calibration as described above.

Figure 6A:
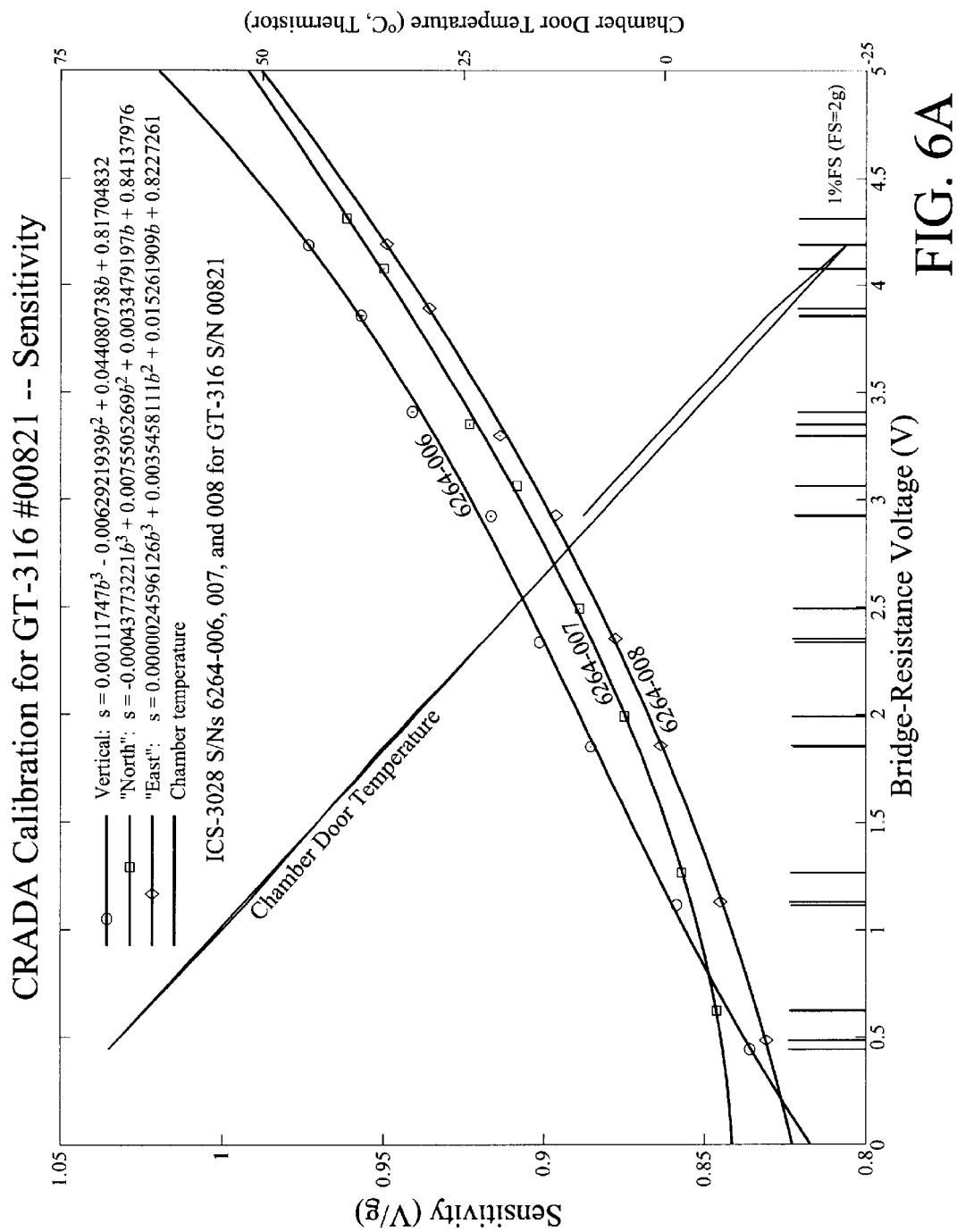
FIGS. 6a and 6b are graphs showing the sensitivities and offset, respectively, for three typical ICS-3028™ accelerometers in the circuit of FIGS. 4–5 when measured by the present calibration method.
Figure 6B:
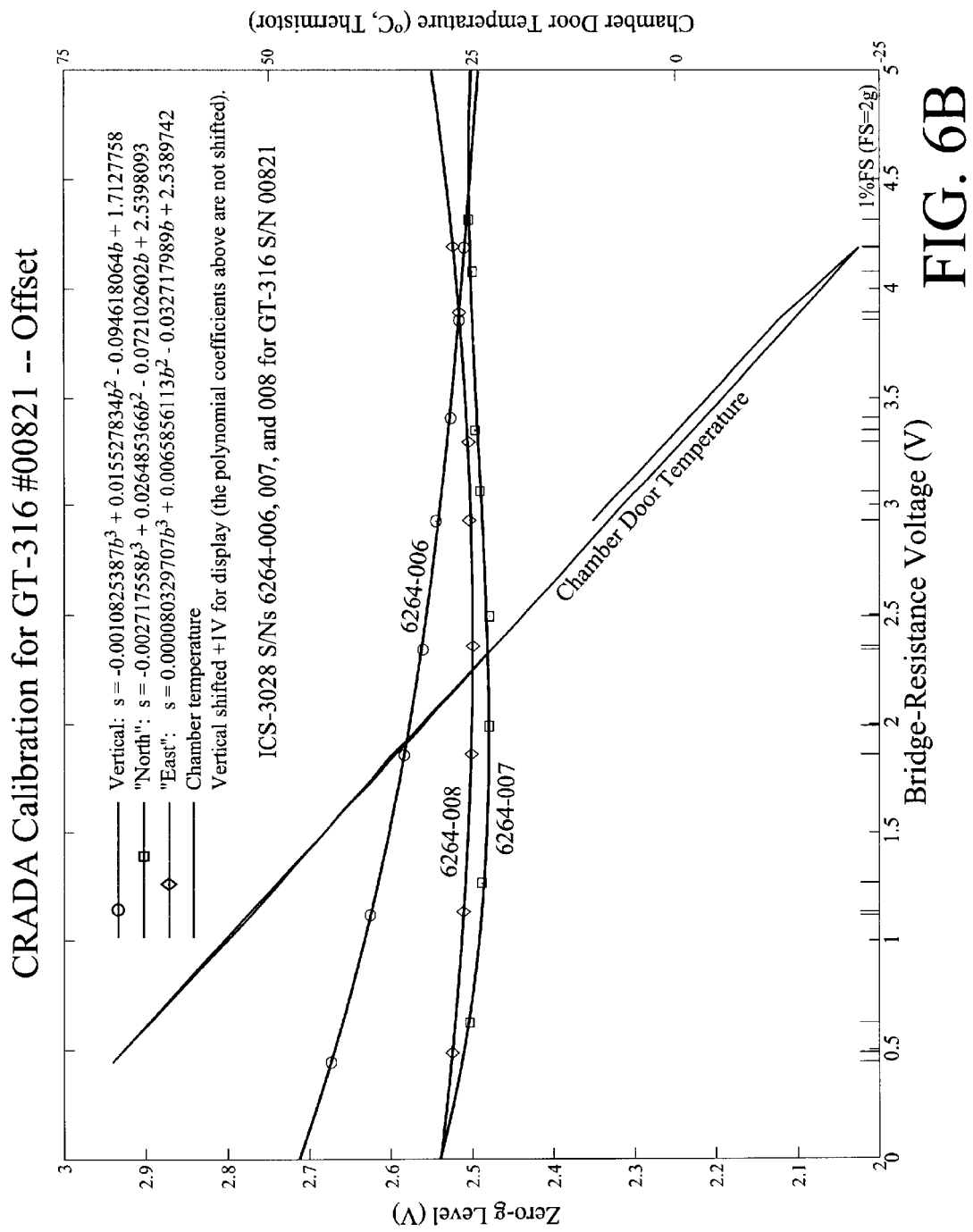

FIGS. 6*a* and 6*b* are graphs showing the sensitivities and offsets, respectively, for three typical ICS-3028™ accelerometers in the circuit of FIGS. 4–5 when measured by the present Manufacturing Calibration method described above. These are a vertical and two horizontals of one typical three-accelerometer system (the illustrated accelerometers were independent of one another). The circles, squares, and diamonds are the test points at which data were taken. Within each symbol are small lines that span the entire range of values (not standard deviations) measured at those test points (in most cases, these small "+"-like patterns are so small as to be indiscernible or appear as small dots.) Polynomial fits are applied to the data, and the curving dashed lines of FIGS. 6*a* and 6*b* passing through or near the measured points are third-order polynomial fits to the data. These polynomials are the calibration curves that are used for subsequent temperature compensation for variations in sensitivity and offset. Also shown on FIGS. 6*a* and 6*b* are a series of vertical bars along the bottom of the plot, each representing 1% of full scale at that temperature for that accelerometer. It is clear from comparing these to the data and polynomial fits that the accuracy of this calibration is far better than 1% (contrasted to up to 9%FS offset variations by just using manufacturer specifications for the resistors).

Some individual accelerometers seem to require the third-order fit to eliminate systematic patterns from the residuals, but others seem to be adequately fit by a second-order polynomial. Given the polynomial fits, the polynomials are used for Digital Compensation. They can be used directly for maximum precision in the compensation of the sensors, typically in a post-processing environment, or to generate tables for compensation, typically in an instrumental environment. In either case, they form the basis for the digital portion of the present dual analog/digital compensation method.

Given a second or third-order polynomial fit to the data, digital compensation is accomplished as follows. For each measured voltage across Rt (J4, pin5), the offset and sensitivity for that accelerometer component is derived from these polynomials, and the voltage indicating acceleration (J4, pin2) is corrected by subtraction for the offset, then corrected by division for the sensitivity, simultaneously converting from voltage to acceleration units. Compensation is implemented automatically by programming the seismograph processor to adjust all subsequent real-time acceleration measurements in accordance with the calculated sensitivity and offset. In most seismographs, which typically have only integer processors, it may be necessary to use a lookup table to approximate the polynomial. Even so, just a few dozen entries per device are sufficient to achieve 1%FS accuracy. Moreover, subsequent post-processing can be performed in the laboratory to refine this accuracy with full polynomial and 64-bit floating-point processing. This digital compensation in the seismograph and/or laboratory is a key innovation of the present accelerometer system.

Figure 7:
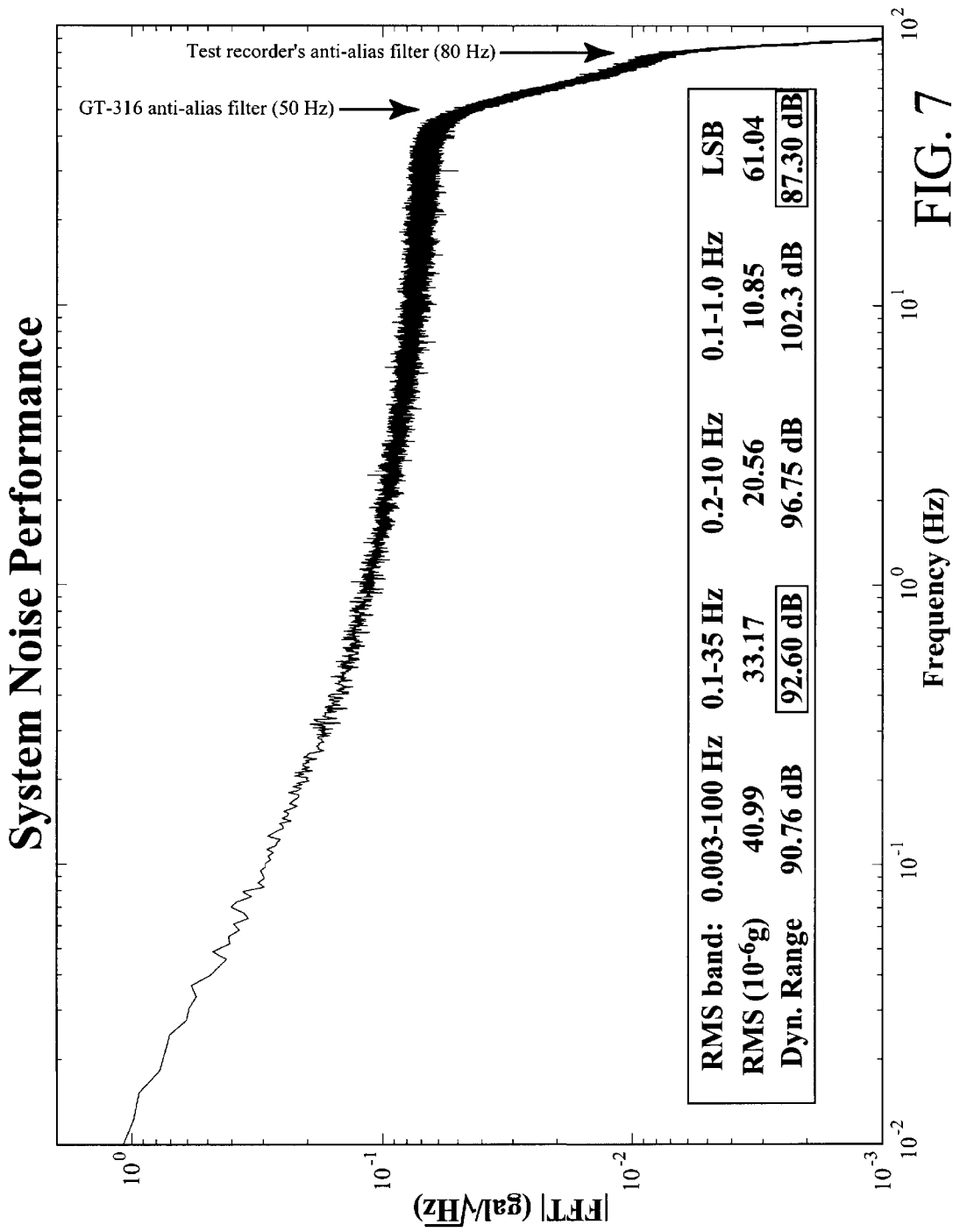
FIG. 7. is a noise amplitude spectrum and RMS over various bands of the present invention. "Dyn. Range" is the dynamic range of the sensor system compared against the RMS of the largest non-clipping sine wave in a ±2 g recording system. "LSB" refers to the least significant bit of a 16-bit ±2 g recording system.

FIG. 7. is a noise amplitude spectrum and noise RMS over various bands of the present invention. It was generated by measuring long intervals of the sensor output at J1, J3, and J3 for five such accelerometer systems in very quiet rock vaults known to have effectively zero Earth-noise input to the sensor. That is, the output of the system at this vault represents system noise alone. These long noise samples were compensated for temperature using the calibration polynomials. We then computed Fourier transforms of these long time series, processed these spectra to noise power spectra, ensemble-averaged these, and reduced this to a noise amplitude spectrum. The RMS values in the table in FIG. 7 were generated from these spectral values. It is clear from both presentations that this accelerometer system significantly exceeds the requirement for 90.3 dB dynamic range in a ±2 g system, reaching 92.6 dB over 0.1 to 35 Hz.

The above-described accelerometer can be fully calibrated and compensated for the effects of temperature on sensor gain and offset, it is a low-noise system with >90.3 dB signal-to-noise ratio in the band 0.1 to 35 Hz, it has excellent signal-quality characteristics, and it is a very robust system resistant to mechanical shock, spring sag under long exposure to gravity, and other abuses, wear, and tear, resulting in low maintenance costs. Moreover, the system can be manufactured at comparatively low cost and presents an outstanding value proposition.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claim.

We claim:

1. An accelerometer sensor for use in a strong-motion seismologic accelerometer network, comprising:
   three accelerometer sensor circuit boards for measuring acceleration along respective x, y, and z axes, each of said boards further comprising a micro-machined accelerometer component with a piezo-resistor Wheatstone bridge;
   a main circuit board comprising a regulated power supply, precision voltage reference, and acceleration and temperature sensing circuits;
   an electrically non-conductive block having at least three substantially orthogonal faces;
   wherein the three accelerometer sensor circuit boards are each mounted on a respective orthogonal face of the non-conductive block.

2. The accelerometer sensor according to claim 1, wherein said block is formed of thermally insulative material.

3. The accelerometer sensor according to claim 1, wherein said non-conductive block is formed of Delrin™ polyoxymethylene.

4. The accelerometer sensor according to claim 1, wherein said micro-machined accelerometer components are ICS-3028™ accelerometers.

5. An accelerometer system for use in a strong-motion seismologic accelerometer network, comprising:
   three accelerometer sensors each for measuring acceleration along respective x, y, and z axis, and each comprising a micro-machined accelerometer circuit component, a piezo-resistor bridge, and supporting circuitry inclusive of acceleration and temperature sensing circuits, said micro-machined accelerometer circuit component and corresponding piezo-resistor bridge for each accelerometer sensor being mounted on a discrete circuit board, and said supporting circuitry for all three accelerometer sensors being mounted on a fourth and separate circuit board.

6. The accelerometer system for use in a strong-motion seismologic accelerometer network according to claim 5, further comprising power supply and voltage reference circuitry mounted on said fourth and separate circuit board.

7. The accelerometer system for use in a strong-motion seismologic accelerometer network according to claim 5, further comprising a non-conductive block, the three discrete circuit boards containing said micro-machined accelerometer circuit components and corresponding piezo-resistor bridges being mounted on a respective orthogonal face of the non-conductive block.

8. The accelerometer system for use in a strong-motion seismologic accelerometer network according to claim 5, wherein said three discrete circuit boards containing said micro-machined accelerometer circuit components and corresponding piezo-resistor bridges are connected to the fourth and separate circuit board by flexible jumper cables.

9. The accelerometer system according to claim 5, wherein said non-conductive block is formed of Delrin™ polyoxymethylene or like plastic.

10. A method for temperature calibration of an accelerometer sensor board for use in a strong-motion seismologic sensor system, said accelerometer sensor board including a micro-machined accelerometer component with a piezo-resistor bridge, the method comprising the steps of:
    pre-determining a series of correction factors for measured acceleration of said accelerometer sensor board as a finction of temperature;
    measuring a resistance across the piezo-resistor bridge as a surrogate indication of the accelerometer's temperature.

11. The method for temperature calibration of an accelerometer sensor board according to claim 10, wherein said step of pre-determining a series of correction factors further comprises the steps of:
    temperature-stabilizing said accelerometer sensor board;
    measuring a series of test-vector pairs of the acceleration signals of said accelerometer sensor board; and
    calculating a sensitivity and offset for said accelerometer sensor board as a finction of the measured test-vector pairs of the acceleration signals.

12. A method for digital compensation of an accelerometer sensor board calibrated in accordance with the method of claim 10, comprising the step of using said accelerometer sensor board to measure acceleration and applying the correction factor that corresponds to said surrogate temperature to the measured acceleration.

13. A method for digital calibration and compensation of an accelerometer sensor for use in a strong-motion seismologic accelerometer network, said accelerometer sensor including three accelerometer sensor circuit boards for measuring acceleration along respective x, y, and z axes, and each outputting an acceleration signal comprising a voltage corresponding to acceleration along said axes, said method for digital calibration comprising the steps of:
    temperature-stabilizing said accelerometer sensor;
    measuring a series of test-vector pairs of the acceleration signals of each of said three accelerometer sensor circuit boards;
    calculating a sensitivity and offset for each of said three accelerometer sensor circuit boards as a function of the measured test-vector pairs of the acceleration signals;
    automatically compensating all subsequent real-time acceleration measurements in accordance with said calculated sensitivity and offset.

14. The method for digital calibration and compensation of an accelerometer sensor for use in a strong-motion seismologic accelerometer network according to claim 13, wherein said step of calculating a sensitivity and offset for each of said three accelerometer sensor circuit boards as a function of the measured test-vector pairs further comprises calculating two of second- or third-order polynomials for said measured series of test-vector pairs.

15. The method for digital calibration and compensation of an accelerometer sensor for use in a strong-motion seismologic accelerometer network according to claim 14, wherein said step of automatically compensating all subsequent real-time acceleration measurements further comprises compensating directly in accordance with said second- or third-order polynomial for said measured series of test-vector pairs.

16. The method for digital calibration and compensation of an accelerometer sensor for use in a strong-motion seismologic accelerometer network according to claim 14, wherein said step of automatically compensating all subsequent real-time acceleration measurements further comprises generating a compensation look-up table from said second- or third-order polynomial, and automatically compensating all subsequent real-time acceleration measurements in accordance with said compensation look-up table.

17. The method for digital calibration and compensation of an accelerometer sensor for use in a strong-motion seismologic accelerometer network according to claim 13, wherein said step of measuring a series of test-vector pairs of the acceleration signals of each of said three accelerometer sensor circuit boards further comprises using an integrating voltmeter to read the acceleration signals there from.

18. The method for digital calibration of an accelerometer sensor for use in a strong-motion seismologic accelerometer network according to claim 13, wherein said step of measuring a series of test-vector pairs of the acceleration signals of each of said three accelerometer sensor circuit boards further comprises measuring at least four test-vector pairs for each of said three accelerometer sensor circuit boards.

\* \* \* \* \*